United States Patent [19]

Seki

[11] Patent Number: 4,799,806
[45] Date of Patent: Jan. 24, 1989

[54] MINIATURE LINEAR GUIDE APPARATUS

[75] Inventor: Takahiro Seki, Maebashi, Japan

[73] Assignee: Nippon Seiko Kabushiki Kaisha, Tokyo, Japan

[21] Appl. No.: 124,883

[22] Filed: Nov. 24, 1987

[30] Foreign Application Priority Data

Nov. 28, 1986 [JP] Japan .............. 61-183096[U]
Jan. 19, 1987 [JP] Japan ............... 62-5762[U]

[51] Int. Cl.$^4$ ............................. F16C 29/06
[52] U.S. Cl. ..................................... 384/45
[58] Field of Search ............. 384/45, 43, 44, 539; 464/168

[56] References Cited

U.S. PATENT DOCUMENTS 4,582,371 4/1986 Mottate ........................ 384/45
4,647,226 3/1987 Mottate ........................ 384/45
4,701,057 10/1987 Kashiwabara ................. 384/43
4,701,058 10/1987 Mottate ........................ 384/45

Primary Examiner—Lenard A. Footland
Attorney, Agent, or Firm—Basile and Hanlon

[57] ABSTRACT

A miniature linear guide apparatus includes a guide rail having a U-shaped cross section, and a slider movable in the longitudinal direction of the guide rail supported by balls inserted in ball rolling channels formed between each of the inner surfaces of side walls of the guide rail and each of the outer surfaces of the sides of the slider. The slider includes two ball guide members respectively having ball passage arranged parallel to each other and parallel to the ball rolling channels. Each of the ball passages has curved ball passages at opposite ends of the ball passage to connect corresponding ends of the ball rolling channel and the ball passage thereby to constitute a circulating path for the balls through the ball rolling channel passage, the curved passages, and the ball passages.

4 Claims, 7 Drawing Sheets

MINIATURE LINEAR GUIDE APPARATUS

BACKGROUND OF THE INVENTION

1. Field of the Invention

The present invention relates to a miniature linear guide apparatus having a slider movable in the axial direction, and in particular, to an improved miniature linear guide apparatus which is very compact and light in weight and which facilitates interchanging sliders of a different width.

2. Description of the Prior Art

As a prior art miniature linear guide apparatus, there is a disclosure, for example, in Japanese Laid-Open Patent Publication No. 61-136018 (1986) and U.S. Pat. No. 4,647,226. In this prior art example, a table is placed on a bed having a U-shaped section so that the lower surface of the table faces the upper surface of a bottom wall of the bed. Each side wall of the bed is formed with a groove in the inner surface thereof in the longitudinal direction, and also, each lateral side of the table is formed with a groove in the longitudinal direction, so that the grooves of the table oppose the corresponding grooves of the bed. The corresponding grooves of the table and bed form a track channel, in which balls are assembled to constitute a bearing structure. A pair of no-load ball circulation paths are formed within the table in the longitudinal direction. This pair of no-load ball circulation paths are formed with an upper cover and a lower cover, that is, with a single member in the lateral direction and two members in the vertical direction. These upper and lower covers form a pair of no-load ball circulation paths which are fixed integrally to the table with rivets. In addition, on the opposed sides of the table, facing the inner surfaces of the side walls of the bed, there are provided additional retainers or protrusions for guiding the balls and maintaining the upper and lower covers in fixed relationship.

However, in the prior art miniature linear guide apparatus, since the retainers have protrusions arranged to guide the balls rolling along the track channels to the ball no-load circulation paths, the interval between the inner surface of the side wall of the bed and the side of the table cannot be reduced, resulting in shallow ball rolling grooves of the track channel. Consequently, the load capacity in the vertical direction is small, requiring the whole structure to become large and thus the weight of the table increases. This poses a problem in that the response is degraded and the frictional resistance is also increased.

Moreover, since the pair of no-load ball circulation paths formed within the table are formed with two upper and lower covers, and since these members and the retainers are fixed to the table integrally by means of rivets, the assembling is troublesome. Furthermore, when the upper cover and the lower cover are molded, if there is an error in molding, the upper and lower covers will deviate from each other after assembly. When such a deviation occurs, the rolling movement of the balls in the no-load ball circulation paths will be hindered, and the apparatus is defective resulting in low product yield.

Furthermore, since both no-load ball circulation paths are formed in a single member, in order to meet the requirement for a table of a different width, it is necessary to manufacture an upper cover and a lower cover anew which form the no-load ball circulation paths to match the design of the table of different width. This, in turn, requires manufacture of a new mold in order to manufacture the new members.

SUMMARY OF THE INVENTION

The present invention was made in view of the aforementioned problems in the prior art, and it is an object of the invention to provide a miniature linear guide apparatus which is easily assembled, light in weight, and has satisfactory accuracy in positioning.

Another object of the present invention is to provide a miniature linear guide apparatus which does not require manufacture of a new mold for the ball guide members when a table (slider) having a different width is to be designed and manufactured, enabling the product yield to be improved.

According to one aspect of the invention, a miniature linear guide apparatus comprises a guide rail extending longitudinally and having a U-shaped cross section, and a slider movably placed on the guide rail. The guide rail has ball rolling grooves formed in the inner surfaces of side walls in the longitudinal direction. The slider includes a race member having an inverted U-shaped cross section and having ball rolling grooves formed in the outer surfaces of the side walls so that the ball rolling grooves of the slider respectively oppose the ball rolling grooves of the guide rail thereby constituting a pair of ball rolling channels. The slider also includes first and second ball guide members disposed within the U-shaped recess of the race member. The first and second guide members have two ball passages formed therein, and in communication with the ball rolling channels to form a pair of circulating paths. Multiple balls are inserted in the pair of circulating paths to enable the balls to circulate while rolling. Positioning holes are bored in either one of the race members or the first and second guide members, and positioning protrusions are formed on the other of the race member or the first and second guide members to fix the race member and the first and second guide members as a unit by fitting the positioning protrusions into the positioning holes. Each of the first and second guide members has, at longitudinal opposite ends, protruding portions which protrude into the ball rolling groove of the guide rail to form curved ball passages respectively. The curved ball passages bring the ball passage within the ball guide member into communication with the ball rolling channel to form a circulating path. In the above embodiment of the present invention, ball passages are respectively formed in the first and second guide members so that each of the ball passages is in communication with the ball rolling channel formed by the ball rolling grooves of the guide rail and the race member. The race member and the first and second guide members are fixed a a unit to constitute the slider by fitting the positioning protrusions into the positioning holes of the race member or the first and second guide members. Therefore, the assembling is very easy and the positioning accuracy can be improved. Moreover, the first guide member and the second guide member can be formed by the same mold, and a slider having a different width can be manufactured easily by merely changing the width of the race member as required. Furthermore, since each of the first and second guide members is provided with protruding portions at opposite ends which protrude into the ball rolling groove of the guide rail to guide the balls to the ball passage within the slider, the opposing surfaces of the side wall of the guide rail and the side of the slider can be made close to each other. As a result, the depth of the ball rolling grooves formed in the guide rail and the slider can be increased, and hence the contact angle of the ball with the groove surface can be made nearly perpendicular. Thus, the load capacity in the vertical direction can be increased.

According to another embodiment of the present invention, each of the first and second guide members includes a lower guide section having a ball passage which substantially or solely guides the balls, and a closing plate section which closes the opening of the lower guide section and which is joined integrally with the lower guide section. Furthermore, each of the first and second guide members has at longitudinal opposite ends, protruding portions protruding into a ball rolling groove of a guide rail, and has brim portions to form curved ball passages which bring the ball passages within the guide member into communication with the ball rolling channels formed by opposing ball rolling grooves of the guide rails and race member. The race member and the first and second guide members are fixed by means of positioning holes and positioning protrusions integrally thereby to constitute a slider.

In the above aspect of the invention, since the ball passages, which are respectively in communication with the ball rolling channels formed by the ball rolling grooves of the guide rail and the race member, are formed respectively in the first and second guide members, and since each of the first and second guide members is constituted by two separate parts, including the lower guide section having the ball passage which substantially guides the balls and the closing plate section which closes the opening of the lower guide section, there is no influence to the ball guiding surface even when the lower guide section and the closing plate section are deviated positionally relative to each other at the time of joining.

Other objects and features of the invention will become apparent by reference to the following specification and to the drawings.

DESCRIPTION OF THE PREFERRED EMBODIMENTS

A first embodiment will be described hereinafter with reference to FIGS. 1-7.

Figure 1:
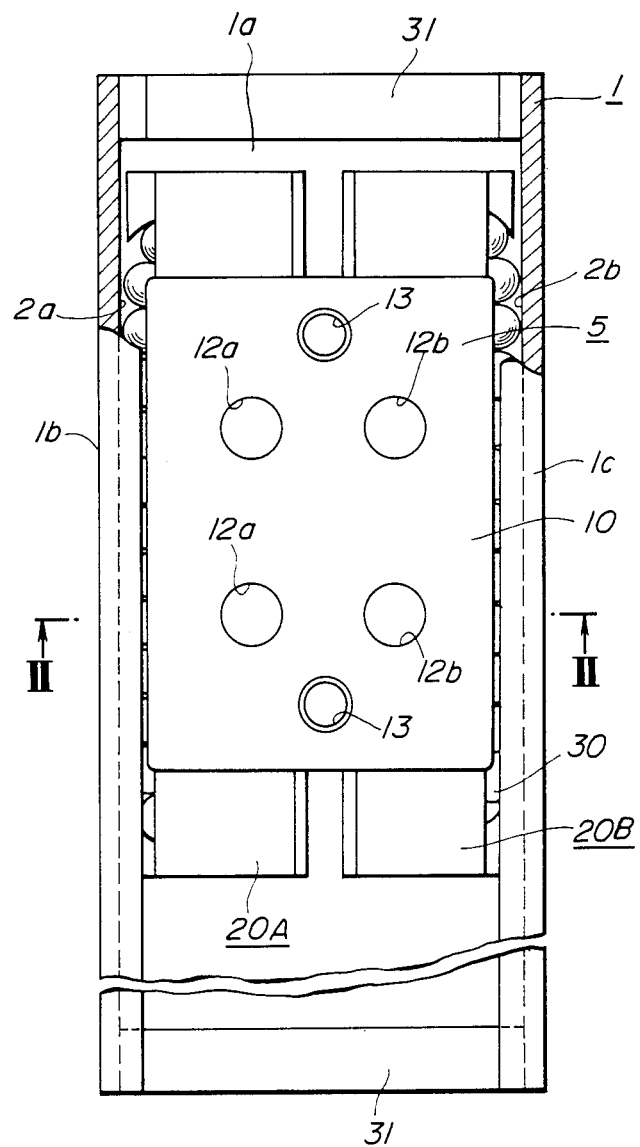
FIG. 1 is a plan view of a first embodiment of the present invention.

In FIG. 1, reference numeral 1 designates a guide rail made of steel for guiding a slider. The guide rail 1 includes a bottom plate portion 1a and side walls 1b, 1 extending upwardly from both side edges of the bottom plate portion 1a to form a U-shaped cross section. Formed in the inner surfaces of the side walls 1b and 1c are ball rolling grooves 2a and 2b extending in the longitudinal direction. These ball rolling grooves 2a and 2b are in parallel opposing relationship to each other, and the cross section of the ball rolling grooves 2a and 2b is a so-called Gothic arch shape wherein two circular-arcs having different centers, but having the same curvature are formed in a V shape. The bottom plate portion 1a has a screw hole 3, as shown in Fig. 2, formed therein to mount the guide rail 1 to a surface when the miniature guide apparatus is to be used.

Figure 2:
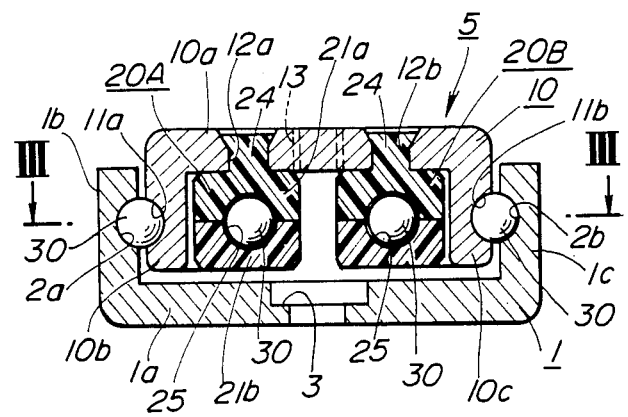
FIG. 2 is a sectional view taken along the line II—II in FIG. 1.

The slider 5, as shown in FIG. 2, includes a race member 10 made of a thin walled steel, and first and second ball guide members 20A and 20B made of synthetic resin.

The race member 10 has an outer width narrower than the inner width between the side walls 1a and 1b of the guide rail 1, and includes an upper plate portion 10a and side walls 10b, 10c extending downwardly from the side edges of the upper plate portion 10a to form an inverted U-shaped cross section. The race member 10 is disposed between the side walls 1b and 1c of the guide rail 1. The race member 10 also has ball rolling grooves 11a and 11b, formed in the outer surfaces of the side walls 10b and 10c, extending in the longitudinal direction so that the ball rolling grooves 11a and 11b oppose the ball rolling grooves 2a and 2b, respectively, of the guide rail 1. The cross section of the ball rolling grooves 11a and 11b has a Gothic arch shape similar to that of the ball rolling grooves 2a and 2b of the guide rail 1. The upper plate portion 10a has positioning holes 12a and 12b formed therein with their upper ends bevelled in a tapered shape. Additionally, attaching means, such as screws 13 for mounting other members thereto, are provided on plate 10a.

Figure 4:
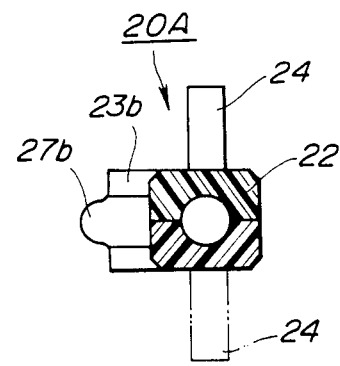
FIG. 4 is a cross sectional view of an example of a ball guide member which is applicable to the present invention.
Figure 3:
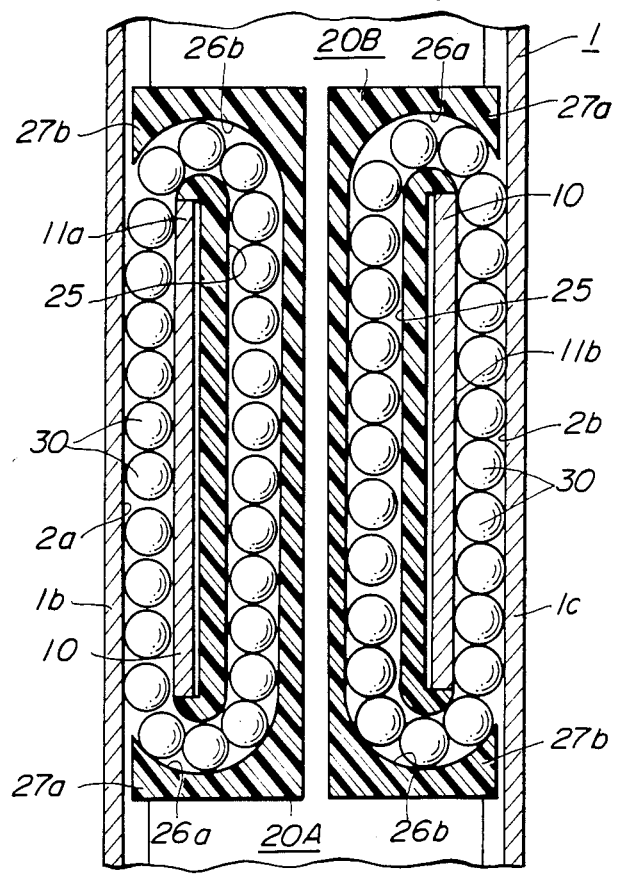
FIG. 3 is a sectional view taken along the line III—III in FIG. 2.
Figure 5:
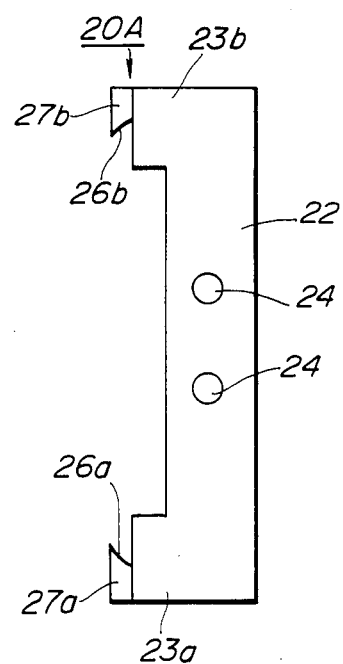
FIG. 5 is a top view of the ball guide member of FIG. 4.
Figure 6:
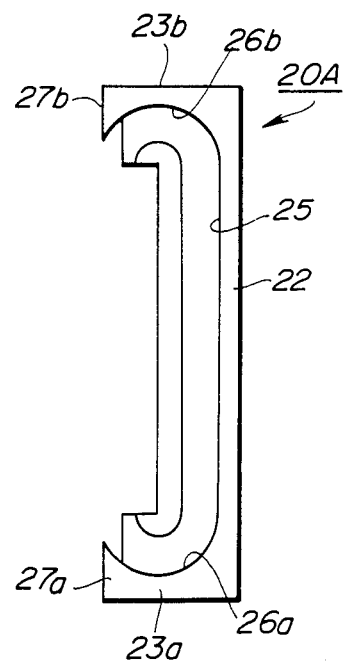
FIG. 6 is a top view of a lower half of the ball guide member wherein an upper half is removed.

As shown in FIG. 2, the first and second ball guide members 20A and 20B have the same shape, and each of the guide members 20A and 20B includes an upper body 21a and a lower body 21b, which comprise, as shown in FIGS. 4-6, a trunk section 22, and brim sections 23a and 23b provided at opposite ends of the trunk section 22 and protruding so as to abut at inside portions against opposite end faces of the race member 10. On the upper surface of the trunk section 22, there are provided protrusions 24 which engage the positioning holes 12a and 12b. Furthermore, within the trunk section 22, there is formed a ball return passage 25 extending in the longitudinal direction and having a circular cross section. Both ends of the ball return passage 25 are in communication with curved ball passages 26a and 26b which are spaces of a half-doughnut shape formed at the inner sides of the brim sections 23a and 23b. Specifically, the inner circular-arc surface and the outer circular-arc surface of each of the curved ball passages 26a and 26b are connected to the ball return passage 25. The ball return passage 25 and curved ball passages 26a, 26b constitute a part of the ball circulating path.

The outside end of each of the curved ball passages 26a and 26b, not connected to the ball return passage 25, has an inner circular-arc surface connected to the ball rolling groove 11a (or the ball rolling groove 11b in the case of the second guide member 20B) of the race member 10, and has an outer circular-arc surface extending, together with a protrusion 27a or 27b, from the brim portion 23a or 23b, into the ball rolling groove 2a (or 2b in the case of the second guide member 20B). The protrusions 27a and 27b have acute ends opposing each other and substantially parallel to the ball rolling groove 2a (or 2b in the case of the second guide member 20B).

The first and second guide members 20A and 20B are accommodated in a recess defined by the upper plate portion 10a and side walls 10b, 10c of the race member 10. The positioning protrusions 24 formed on the upper surface of the guide members 20A and 20B are fitted into the positioning holes 12a and 12b of the race member 10, so that the inner surfaces of the brim portions 23a and 23b abut against the opposite end surfaces of the side walls 10b and 10c in the longitudinal direction. By fixing the upper portions of the positioning protrusions 24, such as by welding, the race member 10 and the first and second guide members 20A and 20B are made integral with one another thereby forming the slider 5.

In manufacturing each of the first and second guide members 20A and 20B, the upper body half 21a and the lower body half 21b are manufactured using the same mold and the two half bodies 21a and 21b are bonded with bonding adhesive as shown in FIG. 4. Either before or after the bonding, one of the positioning protrusions 24 is removed as shown in phantom in FIG. 4.

The slider 5 is loosely fitted in the U-shaped recess of the guide rail 1, and balls 30 are rollably inserted between the ball rolling grooves 2a, 2b of the guide rail 1 and the opposing ball rolling grooves 11a, 11b of the race member 10. The balls 30 are inserted in Gothic arch-shaped channels formed by the ball rolling grooves 2a, 2b and 11a, 11b, respectively, in a four-point contact condition. As a result, the slider 5 is supported by the guide rail 1 without movement vertically or laterally, and the slider 5 is movable in the longitudinal (axial) direction. Also, in the ball circulating path of each of the first and second ball guide members 20A and 20B of the slider 5, balls 30 are loosely fitted so that they are rollable.

Figure 7:
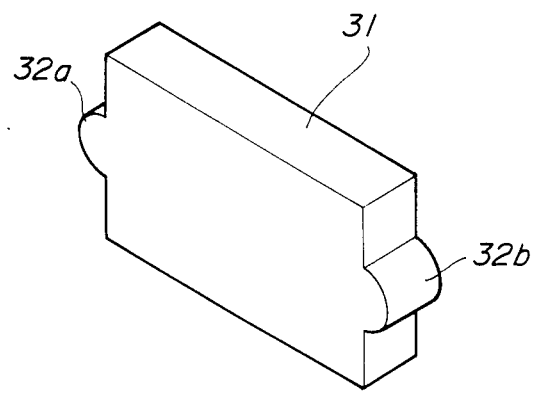
FIG. 7 is a perspective view of an end plate which is applicable to the present invention.
Figure 8:
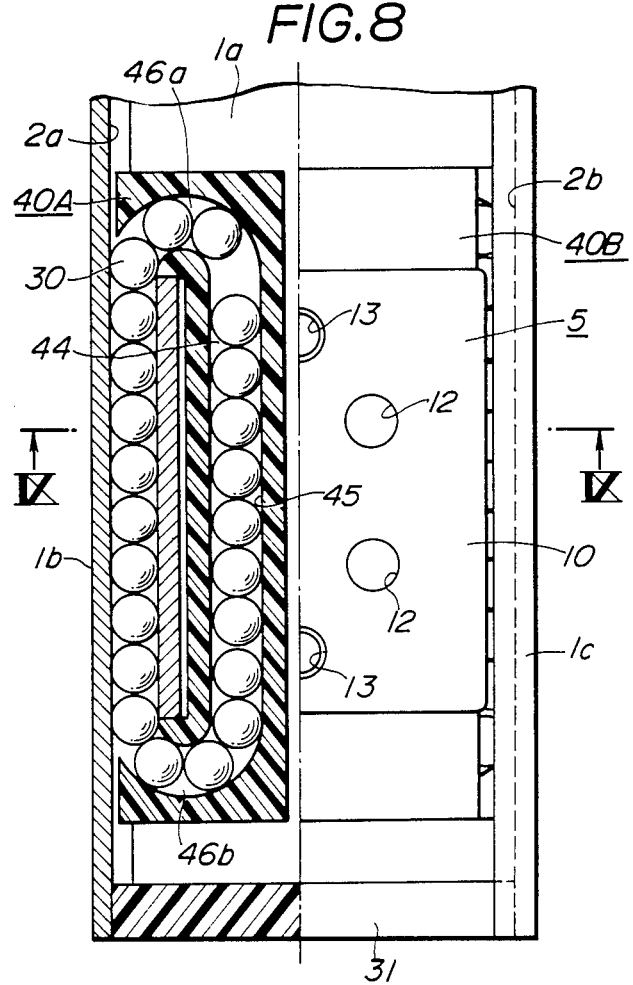
FIG. 8 is a plan view of a second embodiment of the invention with a sectional view of the left half portion.

An end plate 31 made of plastic is secured to each longitudinal end of the guide rail 1 by fitting, bonding or the like to prevent the slider 5 from being drawn out from the guide rail 1. The end plate 31 has, at opposite sides thereof, half round protrusions 32a and 32b, as shown in Fig. 7, for engaging the ball rolling grooves 2a and 2b of the guide rail 1.

In operation, when the slider 5 is moved in the longitudinal direction, the balls 30, inserted between the ball rolling grooves 2a, 2b of the guide rail 1 and the ball rolling grooves 11a, 11b of the slider 5 are rotated with the movement of the slider 5, and are moved in a direction opposite to the movement direction of the slider 5. At the end of the race member 10, the direction of the movement of the balls 30 is changed by the acute ends of the protrusions 27a and 27b to enter the curved ball passages 26a and 26b. Thus, the balls 30 make a U-turn along the curved ball passages 26a and 26b to pass through the ball return passages 25. At the end of ball return passages 25, the balls 30 again make a U-turn at the curved ball passages 26a and 26b and move through the ball rolling channels, respectively, formed between the ball rolling grooves 2a, 2b of the guide rail 1 and the ball rolling grooves 11a, 11b of the race member 10. In this manner, the balls 30 are guided successively and smoothly through the ball circulating passages. In this case, since the balls 30 roll on the bottom of the ball return passages 25 having a stable circular cross section, the circulation of the balls 30 is performed smoothly.

When a slider 5 of a different width is required, a race member 10 having the desired width is prepared, and it is only necessary to secure the aforementioned first and second guide members 20A and 20B to a newly sized race member 10. In this manner, the slider 5 having a different width can be obtained without preparing new guide members 20A and 20B.

In a preferred embodiment of the miniature linear guide apparatus, the diameter of the balls 30 is 2.0 mm, the cross section of the slider 5 is 6×12 mm, the gap between the side of the guide rail 1 and the side of the slider 5 is 0.2 mm, and the weight of the slider 5 is about 14 g.

Furthermore, in the above embodiment, although the side walls 1b and 1c of the guide rail 1 have perpendicular surfaces, the present invention is not limited to this, and the surfaces of the side walls 1b and 1c may be slanted slightly. In such a case, the side surfaces of the race member 10 of the slider b, which are opposed to the side walls 1b and 1c, respectively, may be slanted to form parallel slanting surfaces.

In the above embodiment, although the positioning holes 12a and 12b, and positioning protrusions 24 are provided in the race member 10 and on the ball guide members 20A and 20B, respectively, the positioning protrusions and the positioning holes may, conversely, be provided on the race member 10 and in the ball guide members 20A and 20B, respectively.

As described in the above embodiment, the slider is comprised of the thin-walled race member and the first and second ball guide members separately forming the ball return or circulating passages. This dual design allows the ball guide members to be made small in size. Consequently, a void or space is afforded between the race member and ball guide members, and hence the slider can be made light in weight. In addition, since the first and second ball guide members have identical shapes, these members can be formed by using the same mold. Furthermore, since the ball guide members are independent of the width of the race member, a slider having any desired width may be used without requiring preparation of a new mold for the guide members, allowing a common mold to be used. Thus, the degree of freedom of design is extended. Moreover, the securing of the first and second members to the race member can easily be made by fitting the positioning protrusions into the positioning holes and by thermally fixing them, thereby greatly simplifying assembly. Furthermore, the cross section of the ball return or circulating passage is made circular, and each of the first and second ball guide members is provided with brim portions at opposite ends having the protrusions protruding towards and into the ball rolling groove of the guide rail, and the brim portion is formed with an inner circular-arc surface to form the curved ball passage thereby to guide the balls into the curved ball guide passage. Thus, the balls can roll smoothly. In addition, since the ball rolling grooves of the guide rail and the slider can be formed with a large depth while the opposing surfaces of the guide rail and the slider are positioned close to each other, the load in the vertical direction can be absorbed effectively. Thus, the load-carrying capacity can be increased even using small balls, and the linear guide apparatus can be made small. This, in turn, reduces the inertia of the slider, and the advantage is that the miniature linear guide apparatus has high controllability and little residual vibration when the apparatus is stopped.

In this miniature linear guide apparatus, since the circulation of the balls is smooth, and operational noise levels are low, this apparatus is suitable for business machines and the like which are used in quiet rooms.

The thickness of the side walls of the apparatus is determined in relation to the force exerted on the balls. Although the tolerable accuracy of parts becomes severe as the parts used become small, this severeness is relaxed by the elastic deformation characteristics of the side walls of the guide rail, and as such, a miniature linear guide apparatus having satisfactory controllability can be achieved.

Figure 9:
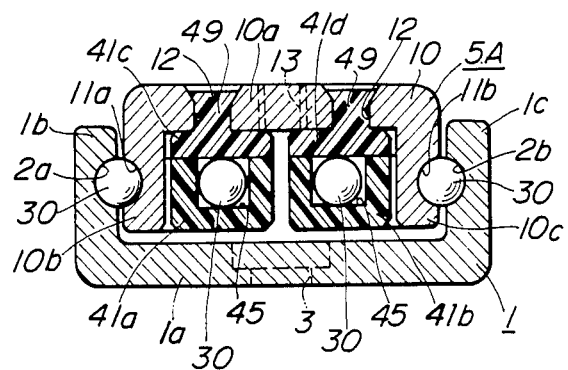
FIG. 9 is a sectional view taken along the line IX—IX in FIG. 8.
Figure 10:
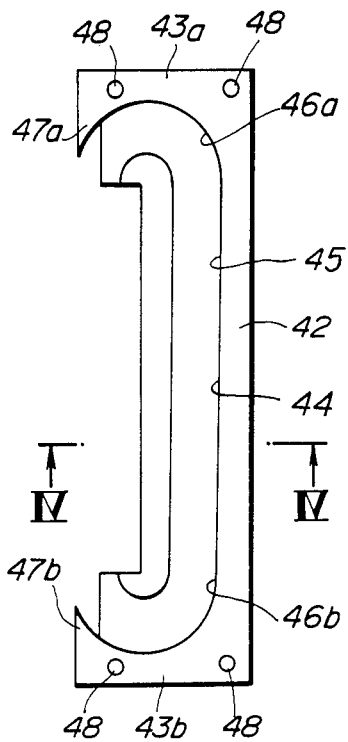
FIG. 10 is a plan view of the lower guide section of the ball guide member in FIG. 9.
Figure 11:
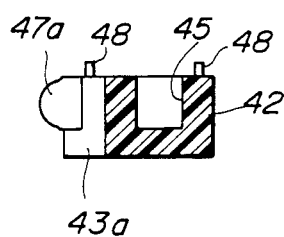
FIG. 11 is a sectional view taken along the line XI—XI in FIG. 10.

A second embodiment of the present invention will be described with reference to FIGS. 8 to 13. The construction of the guide rail 1 and the supporting structure of slider 5A is the same as in the first embodiment. The slider 5A comprises a race member 10 made of thin-walled steel, and first and second ball guide members 40A and 40B made of synthetic resin. Because both the first and second guide members 40A and 40B have the same structure, the description thereof will be made mainly in reference to member 40A, but will apply to both. Each of the first and second guide members 40A and 40B, as shown in FIG. 9, includes a lower guide section 41a and a closing plate section 41c secured to the lower guide section 41a to close an opening 45 therein. The lower guide section 41a, as shown in FIGS. 10 and 11, includes a trunk portion 42, fitted within a recess in the race member 10, and brim portions 43a and 43b formed at opposite ends of the trunk portion 42. One end of each of the brim portions 43a and 43b protrudes toward the side wall 1b or 1c of the guide rail 1. The trunk portion 42 is formed with a linear groove or opening 45 having a square cross section in which balls 30 are loosely fitted. This square groove 45 guides the balls 30 and serves as a ball return passage 44. Thus, the trunk portion 42 has a square U-shaped cross section. The square groove 45 is, at opposite ends thereof, in communication with curved ball passages 46a and 46b formed in the brim portions 43a and 43b. Each of the curved ball passages 46a and 46b is a space defined by an outer circular-arc surface and an inner circular-arc surface which are connected to the ball return passage 44. The ball return passage 44 and the curved ball passages 46a and 46b constitute a ball circulating path.

The other end of each of the curved ball passages 46a and 46b, not connected to the ball return passage 44, is in communication with a ball rolling channel formed by ball rolling groove 2a or 2b of the guide rail 1 and ball rolling groove 11a or 11b of the race member 10. The brim portions 43a and 43b have protrusions 47a and 47b protruding into the ball rolling grooves 2a, 2b of the guide rail 1. The protrusions 47a and 47b have acute ends at the ends of the curved ball passages 46a and 46b.

Figure 12:
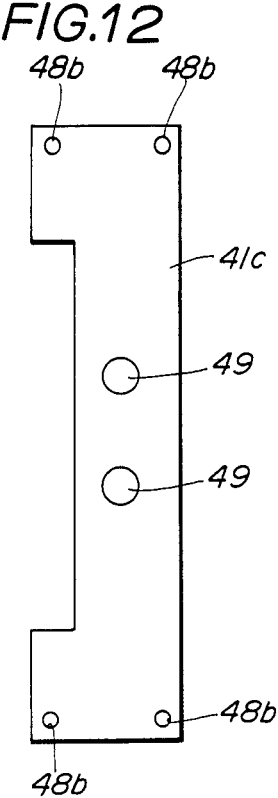
FIG. 12 is a plan view of the closing plate section of the ball guide member in FIG. 9.
Figure 13:
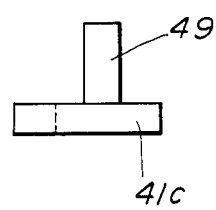
FIG. 13 is a front view of the closing plate section in FIG. 12.

The closing plate section 41c, as shown in FIGS. 12 and 13, is formed in a shape to cover the square groove 45 of the lower guide sections 41a. The plate section 41c has positioning protrusions 49 on the upper surface thereof which are fitted into positioning holes 12 formed in the bottom surface of the race member 10. The closing plate section 41c has fitting holes 48b at the corners thereof for fitting engaging protrusions 48 formed at the corners of the upper surface of the brim portions 43a and 43b. The lower guide section 41a and the closing plate section 41c are secured to each other by fitting the engaging protrusions 48 into the fitting holes 48b and by welding or bonding them.

The slider 5A is assembled integrally with the race member 10 and first and second ball guide members 40A and 40B in the following manner. The first and second ball guide members 40A and 40B are accommodated within a recess of the race member 10, defined by the upper plate portion 10a and side walls 10b and 10c with the positioning protrusions 49 formed on the upper surface of the closing plate section 41c, fitted into the positioning holes 12 of the race member 10. In this case, the inner flat surfaces of the brim portions 43a and 43b abut against the opposite ends of the side wall 10b or 10c. The upper end portions of the positioning protrusions 49 are subsequently welded to the race member 10.

Balls 30 having the same diameter as that of the balls 30 inserted in the ball rolling channels between the slider 5A and the guide rail 1 are loosely fitted into the ball return or circulating passages of the first and second ball guide members 40A and 40B so that the balls 30 can roll and circulate.

In operation, when the slider 5A is moved in a longitudinal direction, the balls 30 inserted between the ball rolling grooves 2a, 2b of the guide rail 1 and the ball rolling grooves 11a, 11b of the race member 10, roll and move in a longitudinal direction. In this case, since the amount of movement of the balls 30 is about half ($\frac{1}{2}$) of the amount of movement of the slider 5A, the balls 30 move to the end of the race member 10. At the end portion of the race member 10, the direction of movement of the balls 30 is changed by the acute end of the protruding portion 47b of the first ball guide member 40A to enter the curved ball passage 46b. Thus, the balls 30 make a U-turn along the curved ball passage 46b, and pass through the ball return passage 44 to enter the curved ball passage 46a at the opposite end. The balls 30 make a U-turn again in the curved ball passage 46a, and move through the ball rolling channel formed between the ball rolling groove 2a of the guide rail 1 and the ball rolling groove 11a of the race member 10. In this manner, the balls 30 are circulated continuously and smoothly through the ball return or circulating passage. This circulation of the balls 30 also takes place in the second guide member 40B.

The balls 30 are guided solely by the square groove 45, having the square cross section, constituting the ball return passage of the lower guide section 41a. Thus, even when a deviation is caused in joining the lower guide section 41a with the closing plate section 41c, this deviation does not affect the formation of the ball circulating passage entirely. As a result, the balls 30 roll in a stable condition and the circulation is performed smoothly.

A third embodiment will be described with reference to FIGS. 14 and 15. In the third embodiment, a closing plate section 51c of first and second ball guide members 50A and 50B is formed by a single, common plate.

Figure 14:
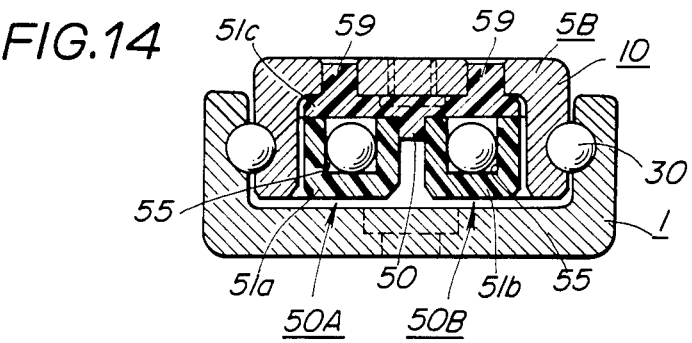
FIG. 14 is a sectional view of a third embodiment of the invention.
Figure 15:
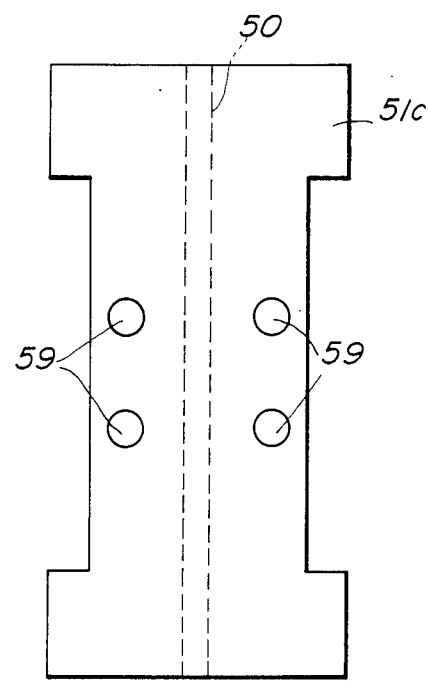
FIG. 15 is a plan view of the closing plate section of FIG. 14.

Specifically, as shown in FIG. 14, the closing plate section 51c for closing the openings of both lower guide sections 51a and 51b of the first and second guide members 50A and 50B is a single integral member. The closing plate section 51c has positioning protrusions 59 on the upper surface which are fitted into positioning holes 12 formed in a race member 10. Additionally, closing plate section 51c has a positioning ridge 52 formed protruding from the lower surface at the center portion corresponding to an interval between the lower guide sections 51a and 51b. The closing plate section 51c and both the lower guide sections 51a and 51b are secured to one another by bonding or the like. The opposing sides of both the lower guide sections 51a and 51b are brought into abutment against corresponding sides of the positioning ridge 52. This embodiment, except for the aforementioned structure, is the same as the second embodiment.

In the third embodiment, since the common closing plate section 51c is used, the number of parts can be reduced as compared with the second embodiment. Furthermore, since the lower guide sections 51a and 51b of the first and second ball guide members 50A and 50B are positioned by the common closing plate section 51c having the positioning ridge 52, it is possible to carry out the positioning of the first and second guide members 50A and 50B more accurately.

Figure 16:
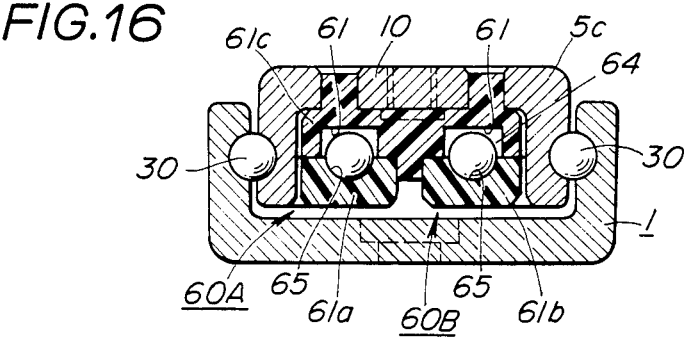
FIG. 16 is a sectional view of a fourth embodiment of the invention.

A fourth embodiment will be described with reference to FIG. 16. In the fourth embodiment, as compared with the third embodiment, each of lower guide sections 61a and 61b has a groove 65 of semi-circular cross section, instead of a square groove 55 as indicated in the third embodiment, thereby to guide the lower half part of the ball 30. Further, a common closing plate section 61c has square grooves 61 having a square cross section, and the inner surfaces of the square grooves 61 do not contact the ball 30. The ball return passages 64 of first and second ball guide members 60A and 60B are formed substantially by the grooves 65 having the semi-circular cross section. Accordingly, even when a positional deviation is caused at the time of assembling the closing plate section 61c and the lower guide sections 61a and 61b, it is possible to prevent the deviation from affecting the formation of the ball return passages 64, thereby enabling the balls 30 to pass smoothly. With the exception of the aforementioned structure, this embodiment is the same as the third embodiment.

As described in the foregoing, in the second to fourth embodiments, each of the first and second ball guide members is comprised of the lower guide section which substantially guides the balls and the closing plate section which closes the opening of the lower guide section. Due to this structure, even when a positional deviation is caused in assembling the lower guide sections and the closing plate section, it is possible to prevent the deviation from adversely affecting the formation of the ball return passages. Consequently, the smooth movement of the balls in the ball return passages can be insured, and the product yield can be improved remarkably. Moreover, since the ball guide members are configured so that they are independent of the width of the race member, a common mold can be used for sliders of different widths. Thus, the degree of freedom of design is extended.

While certain embodiments of the invention have been described in detail in relation to linear guide apparatuses, it will be apparent to those skilled in the art that the disclosed embodiments may be modified. Therefore, the foregoing description is to be considered exemplary rather than limiting, and the true scope of the invention is that defined in the following claims.

I claim:

1. A miniature linear guide apparatus comprising:
    a guide rail extending in a longitudinal direction and having a U-shaped cross section, said U-shaped guide rail having a bottom horizontal surface and vertical walls extending upward therefrom forming a U-shaped recess, said vertical walls having ball rolling grooves formed respectively on inner surfaces thereof so that said ball rolling grooves oppose each other; and
    a slider accommodated in said U-shaped recess of said guide rail, said slider comprising;
        (a) a race member having an inverted U-shaped cross section, said inverted U-shaped race member having a top horizontal surface and vertical walls extending downward therefrom forming a U-shaped recess, and having ball rolling grooves respectively formed in outer surfaces of said vertical side walls, so that said ball rolling grooves of said guide rail respectively oppose corresponding ball rolling grooves of said race member; and
        (b) first and second ball guide members accommodated in said U-shaped recess of said race member and respectively having ball rolling passages formed therein in parallel relationship to each other, each of said ball rolling passages being in communication with a corresponding ball rolling groove of said guide rail and said ball rolling groove of said race member;
    multiple balls inserted rollably in said pairs of said ball rolling grooves of said guide rail and said race member, and in said ball rolling passages of said first and second ball guide members,
    protruding portions formed on said first and second ball guide members at opposite longitudinal ends respectively protruding into and towards one of said ball rolling grooves of said guide rail, each of said protruding portions being formed with a curved ball passage having one end being in communication with one of said ball rolling grooves of said guide rail and said race member and having the other end being in communication with a ball passage of said first or second ball guide member,
    a plurality of positioning protrusions provided on selected one of said race member and said first ball guide member and one of said race member and said second ball guide member, and
    a plurality of positioning holes formed in the other of said first member and said race member and the other of said race member and said second ball guide member, thereby to secure said race member and said first and second ball guide members integrally by fitting said plurality of positioning protrusions into said positioning holes.

2. A miniature linear guide apparatus according to claim 1 wherein each of said first and second ball guide members includes a lower guide section having said ball passage formed therein to substantially guide said balls, and a closing plate section for closing an opening of said ball passage, said lower section and said closing plate section being joined integrally.

3. A miniature linear guide apparatus according to claim 1 wherein each of said first and second ball guide members include an upper half section and a lower half section each having a groove of a semi-circular cross section in the longitudinal direction so that said ball passage having a circular cross section is formed when said upper half section and said lower half section are joined together.

4. A miniature linear guide apparatus according to claim 1 wherein each of said first and second ball guide members has a lower guide section having a groove of a square cross section to form said ball passage.

* * * * *